United States Patent [19]
Simpson et al.

[11] Patent Number: 5,471,359
[45] Date of Patent: Nov. 28, 1995

[54] POLYPHASE CURRENT MONITOR AND CONTROL SYSTEM

[75] Inventors: Elmer J. Simpson, Port Saint Lucie, Fla.; Sergio Picado, London, Ark.

[73] Assignee: Impco Inc., Fort Sumner, N.M.

[21] Appl. No.: 22,306

[22] Filed: Feb. 25, 1993

[51] Int. Cl.⁶ .................................................. H02H 3/093
[52] U.S. Cl. ........................... 361/93; 361/96; 250/227.22
[58] Field of Search ................................. 361/93, 94, 95, 361/96, 97; 324/511, 522; 340/662, 661, 658; 250/227.22

[56] References Cited

U.S. PATENT DOCUMENTS

| | | | |
|---|---|---|---|
| 3,937,952 | 2/1976 | Ripley et al. | 250/227.22 |
| 4,338,647 | 7/1982 | Wilson et al. | 361/96 |
| 4,814,600 | 3/1989 | Bergström | 250/227.22 |
| 5,166,887 | 11/1992 | Farrington et al. | 364/483 |
| 5,224,011 | 6/1993 | Yalla et al. | 361/93 |
| 5,255,148 | 10/1993 | Yeh | 361/93 |
| 5,270,898 | 12/1993 | Elms et al. | 361/96 |

OTHER PUBLICATIONS

IBM Technical Disclosure Bulletin, Transparent Keyless Keyboard for Variable Terminal Applications vol. 20, No. 4 (Sep. 1977, 1609–11).

Primary Examiner—Todd DeBoer
Attorney, Agent, or Firm—Stephen D. Carver; Trent C. Keisling

[57] ABSTRACT

A solid state sensing and control device for monitoring either D.C. or A.C. currents of one or more phases that is ideal for protecting motors and other A.C. loads. The programmable monitoring device can detect an overload or an emergency and virtually instantaneously interrupt motor current to prevent burnout and reduce the danger of fire. High current conductors leading to the motor (or other load) are mechanically routed through current sensing coils. An LCD visible through the cabinet top displays menu information and data. Programming and command control are initiated by pressing one or more of a plurality of light buttons disposed beneath the cabinet that comprise OPIC transmitter-receiver pairs. An instrumentation amplifier is associated with each sensing coil, and the circuitry preferably outputs two amplified analog signals from each coil, the amplitude of the first being proportionately higher than the second. Preferably the CPU switches between the latter signals to automatically select a proper range. The CPU activates a relay field to activate a control relay that in turn activates remote relays associated with the load to be controlled. The relays disconnect current to the load when an error condition or an overload is measured.

20 Claims, 8 Drawing Sheets

POLYPHASE CURRENT MONITOR AND CONTROL SYSTEM

BACKGROUND OF THE INVENTION

Our invention broadly relates to electrical and electronic protection systems that monitor and sense incoming electrical currents. More particularly, the present invention relates to digital control or sensing devices that monitor current in polyphase electrical systems and control downstream electrical loads such as motors and the like.

As will be appreciated by those skilled in the art, the need to provide protective circuits that prevent damage to relatively sensitive electrical components is paramount. The earliest type of protection devices was the well known lead fuses. Fuses continue to serve many important roles in modern electronics. However, more advanced means of protection that employ narrower safety margins are called for in modern applications. Additionally, "smart" devices that would provide diagnostic readouts and/or store operating histories that could later be gleaned from the device to determine the existence of fault conditions or to aid in preventive maintenance would be quite useful.

The prior art is replete with devices both analog and digital that are intended to measure current flow based upon variable conditions. Among the prior art relevant to the present disclosure, Wilson, U.S. Pat. No. 4,229,694, issued Oct. 21, 1980, discloses a power angle relay intended to measure the power angle of a synchronous alternator. Segger, U.S. Pat. No. 4,099,103, issued Jul. 4, 1978, discloses a device for measuring the angular position of a rotor of a synchronous motor.

Emanuel, U.S. Pat. No. 4,348,892, issued Sep. 14, 1982, discloses an apparatus for determining the power angle in Alternating Current machines. Stacey, U.S. Pat. No. 4,669,024, issued May 26, 1987, discloses a multiphase frequency selective phase locked loop with multiphase sinusoidal and digital outputs. Hamby, U.S. Pat. No. 4,104,570, issued Aug. 1, 1978, discloses a digital control system for electric motors. It teaches a technique to time control events over the entire range of motor operation. Hartman, U.S. Pat. No. 4,227,137, issued Oct. 7, 1980, discloses a digital tachometer and slip signal motor control. Stacey, U.S. Pat. No. 4,991,429, issued Feb. 12, 1991, teaches a torque angle and peak current detector for synchronous motors.

Also pertinent to our invention is U.S. Pat. No. 4,979,069, issued Dec. 18, 1990, to Elmer Simpson, a co-inventor of the present invention. A motor fault detector with optical isolation is disclosed by Mr. Simpson in his prior patent. The device is a series of ammeters connected to each phase of an electric motor. Each ammeter is intended to selectively indicate the current flow during start up and run of the motor. It further employs optical isolators responsive to the ammeters and a relay responsive to the optical isolators. When the needles of the ammeters block the optical output from the optical isolators a fault condition is determined in the motor and an appropriate response is initiated. Additional background information relating to the importance of motor winding current monitoring is seen in the background section of U.S. Pat. No. 4,979,069.

Damage to electrical circuits is usually caused by excess current. While the causes of increased current are numerous almost all are hazardous to relatively delicate electrical components. In addition to the above mentioned fuses other types of devices have been used to detect and overcome excessive current loads. Among these devices are phase loss detectors, motor starters utilizing overload heater coils and contacts, bimetallic contacts, and coil-solder heater tubes. A shortcoming of such devices is their general failure to respond quickly enough when a dangerous condition is present to prevent damage to relatively sensitive components.

Therefore, it is desirous to devise a protection device that will be able to detect minor fluctuations in current flow and to evaluate the causes thereof. Such a device would allow a logical series of conditions to dictate whether a shutdown of the electrical circuit was necessary or whether some other action should be taken. Fuses are generally designed to "blow out" after ten seconds at two hundred to six hundred percent of an overload current.

The present device will allow the evaluation to be made of the current over a period of milliseconds rather than seconds to determine whether the circuit should be shutdown or other action taken. Furthermore, the ideal device would facilitate tracking of the current thereby allowing a determination of whether any fault conditions were developing over a period of time. Such information could be stored in temporary memory associated with the beforementioned logic circuits, not unlike the flight recorder of modern aircraft. Hence, the device would necessarily employ an interface with conventional computer equipment to download the data it has acquired. Computer circuitry can store the data for various circuits to determine over a period of time any fault conditions which may be developing or to otherwise evaluate circuit performance. Finally, such a device would need to operate in a stand alone capacity.

An ideal device would be capable of simple and effective computer programming, thereby allowing maintenance personnel to manually reconfigure the device as might be required from time to time. Ideally the apparatus must instantly stop starting current when the load instantaneous current is too high. Moreover, such a device must readily react to unbalanced phases, which are the principal cause of motor failure.

SUMMARY OF THE INVENTION

Our Polyphase Current Monitoring and Control System is designed to sense and monitor electrical currents applied to a lead. Upon the occurrence of a predefined emergency condition, the unit disconnects the lead for safety. It may be employed with single phase alternating current applications, with multiple phase loads, or with direct current applications. The system comprises a compact plastic cabinet having a translucent cover. A plurality of current sensing coils is preferably mechanically associated with the cabinet. The high current conductors leading to the lead to be controlled are passed through the center of the sensing coils, and no electrical connections between our device and the lead being monitored are necessary.

A liquid crystal display (LCD) visible though the cabinet top displays menu information and data. Programming is initiated by "pressing" one or more of a plurality of "light buttons" disposed beneath the cabinet. The light buttons comprise OPIC transmitter-receiver pairs, and they respond when an object, such as a finger, is moved near an infrared transmitting LED that radiates upwardly through the cabinet top. With our light button construction the cabinet may remain sealed.

An instrumentation amplifier is associated with each sensing coil. Subsequent circuitry provides two amplified analog signals from each coil; one signal is preferably ten times the amplitude of the other. Both are delivered to the CPU, which can switch between lines to automatically select a proper range. Command control and user programming of the CPU are effectuated by the light buttons previously discussed. The CPU activates a relay field to activate a control relay that in turn activates remote relays associated with the lead to be controlled. The relays disconnect current to the lead when an error condition is measured. The CPU also controls a back light associated with the LCD that can be used as an alarm to warn of an emergency condition.

Therefore, a primary object of our invention is to provide a compact, self contained, current overload protection system.

Another fundamental object is to provide a solid state current monitoring system that quickly detects and reacts to impermissible amplitude and phase variations in alternating current loads.

A related object of the present invention is to provide an electrical current monitor and control system that is extremely fast and versatile.

Specifically an object of the present invention is to provide a digital, electrical current monitor and control system of the character described that can be user programmed to accommodate varying electrical transients.

A fundamental object of the present invention is to provide a digital, microprocessor controlled current sensing system that can monitor current and phase in multi-phase electrical systems or direct current systems, and, if necessary, disconnect the monitored load for safety protection.

Another object is to provide such a device that can function in single phase, two phase or three phase environments.

A related object is to provide a solid state current monitoring system that can be installed with ease, and that involves only a minimum of customer adjustment.

A related object is to provide a circuit of the character described which is ideally adapted for use in polyphase motor control systems, single phase alternating current systems, or direct current systems.

Yet another object of our invention is to provide a micro processor controlled current sensing system that can monitor and react to improper phase shifts between multiple phases.

A related object of the present invention is to reduce fire hazards.

A further object of the present invention is to provide a more precise overload control than is provided by fuse or analog overload systems.

A related object of the present invention is to provide an overload protection system that has a narrower and more efficient margin of safety than that provided by fuse systems.

A still further object of our invention is to provide a polyphase current monitoring system which is capable of diagnostic use by skilled technicians.

Another object of the present invention is to provide a microprocessor controlled polyphase current sensing device whose time constant and time of responses can be varied through simple software routines.

Another primary object of our invention is to provide polyphase current monitoring apparatus of the character described that may be controlled and monitored from a remote location. It is a feature of the invention that the CPU program may be addressed via suitable serial ports through which data and control instructions may be exchanged through serial communications.

Another important object of the present invention is to provide a polyphase current sensing device of the character described which rapidly reacts to line spikes, transients and noise of precise amplitudes having periods in the order of milliseconds.

A related object of the present invention is to provide software for such a polyphase sensing system that can vary responsive dampening characteristics through its source code. In other words, it is a feature of the present invention that equivalent dampening of the device can be varied digitally by the execution of software subroutines.

Another object of the present invention is to provide a liquid crystal display system that will communicate all working characteristics, setups, and emergency conditions to the technicians.

A still further object of the present invention is to provide a system that may be "push button activated" without the necessity of any moving parts such as those involved with conventional push buttons.

A still further object of our invention is to provide a microprocessor controlled motor protection or electrical current load sensing system of the character described that can be quickly operated with a minimum of user input.

Another fundamental object of the present invention is to provide current sensing capabilities in a microprocessor control, solid state unit of the character described that can easily handle loads of up to 100 amps.

A related object is to provide a digital controller of the character described that automatically shifts to appropriate metering ranges.

Another object is to provide a current sensing and control system of the character described that is only mechanically interconnected with the apparatus to be sensed, and is not electrically connected to the wires being monitored.

Another object is to provide a three phase controlling system of the character described that completely avoids grounding problems and grounding glitches often encountered with conventional three phase systems.

A fundamental object is to provide a microprocessor controlled, menu-driven system of the character described with non-volatile memory for storing selected input and output values without reprogramming.

Another object is to provide a sensing system of the character described that can measure multiple phase symmetry.

Another important object of the present invention is to provide fast current response.

Still another object is to provide a phase difference measurement system, which will also respond to programmable absolute current swings.

Another object of the present invention is to provide a system of the character described which instantly cuts off a motor or other alternating current load when any particular phase exceeds a preset value.

Another object is to provide a system of the character described which instantly cuts off the load when starting current does not decrease within a preset time.

Another object of the present invention is to provide a motor control system that automatically switches to the correct scale in response to different monitored currents. It is a feature of the invention that the system automatically switches to a high reading scale during motor start up, then switches to a lower scale when quiescent conditions are reached.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
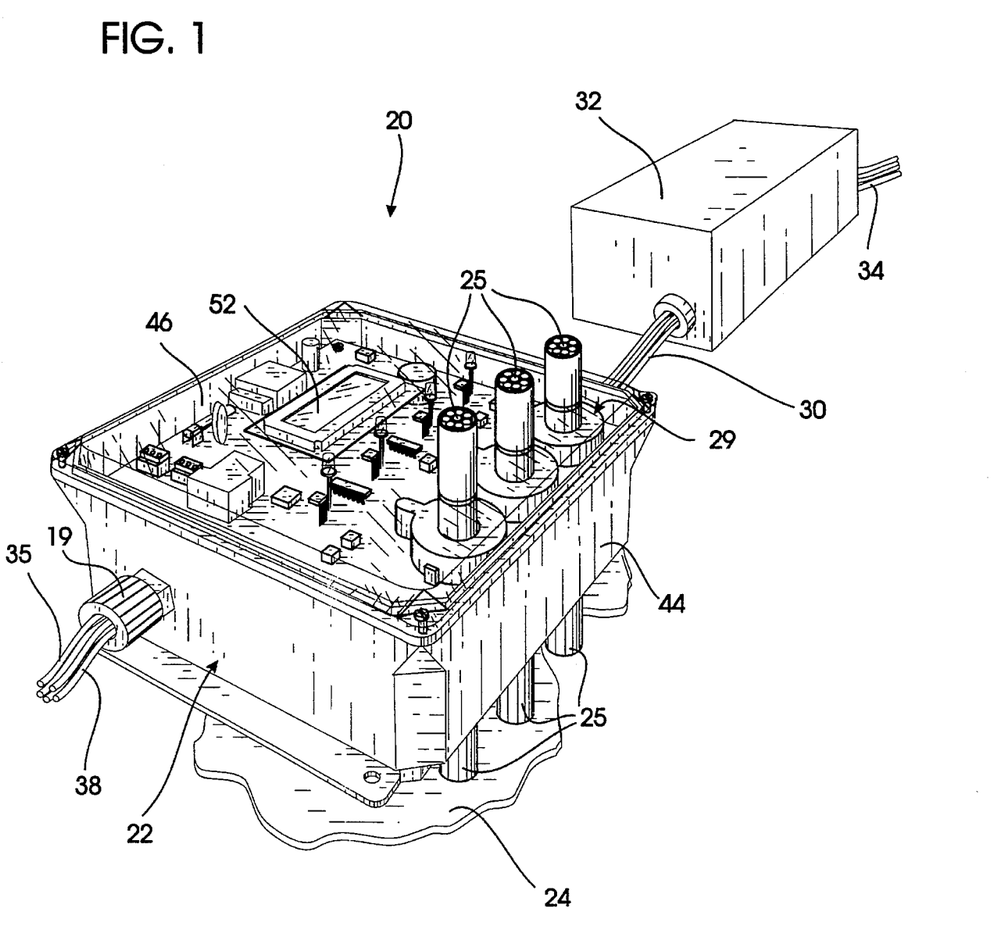
FIG. 1 is a fragmentary perspective view showing our new Polyphase Current Monitoring and Control System in use.
Figure 2:
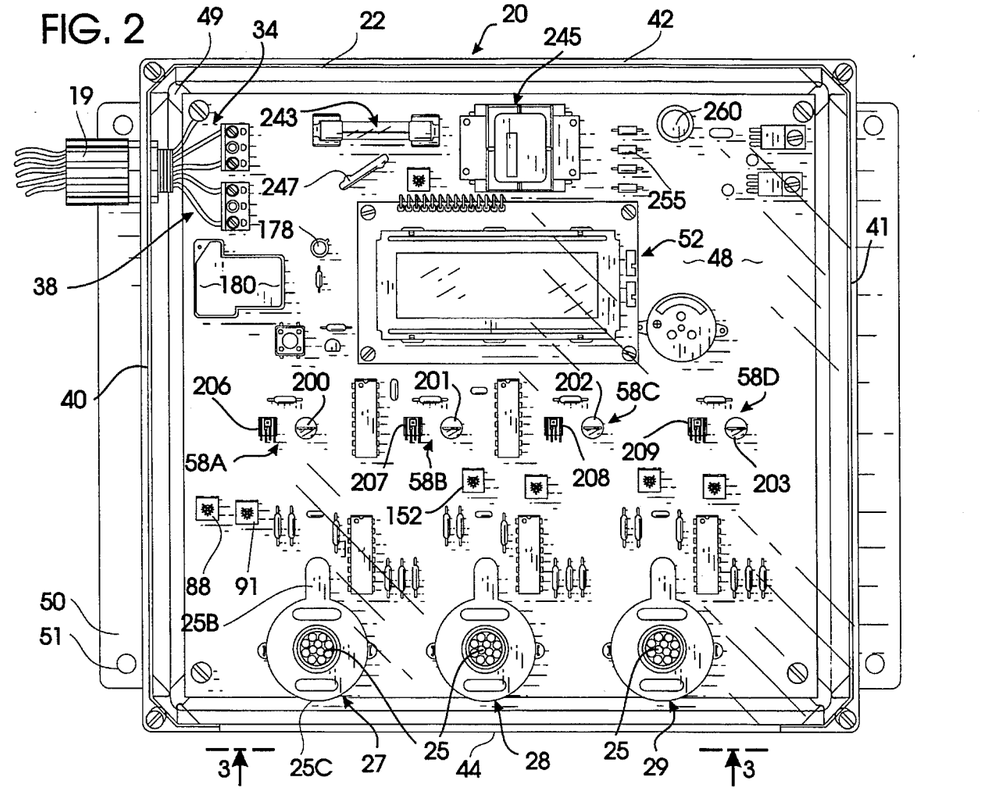
FIG. 2 is an enlarged, fragmentary top plan view thereof.
Figure 3:
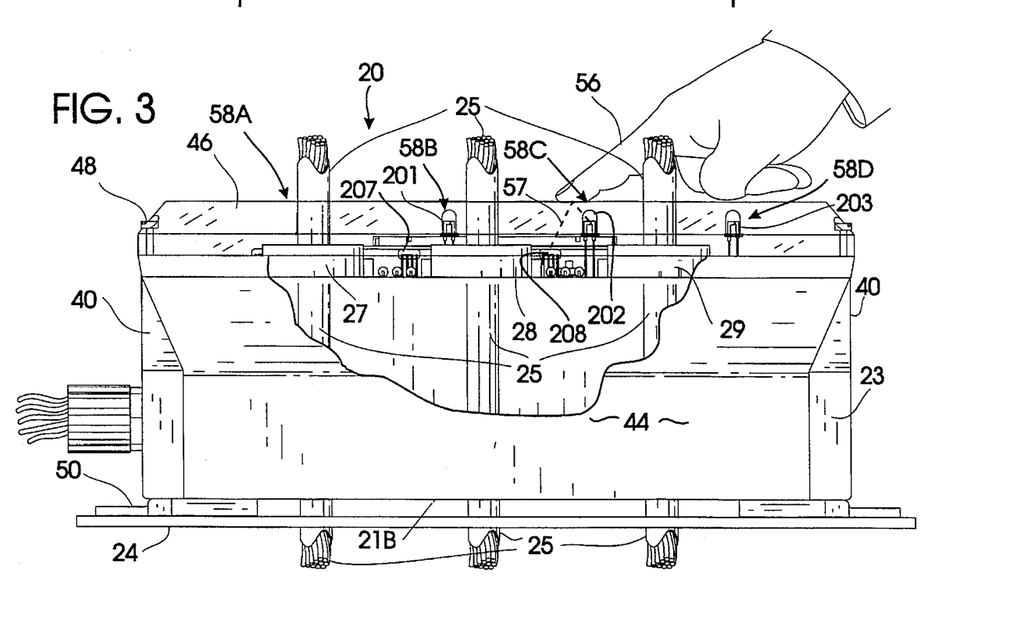
FIG. 3 is a fragmentary, side elevational view thereof, with portions broken away for clarity taken generally along line 3—3 of FIG. 2.

With initial reference directed to FIGS. 1 through 3, the best mode of our Polyphase Current Monitoring and Control System has been generally designated by the reference numeral 20. System 20 is preferably housed in a generally cubical, upright plastic cabinet 22 adapted to be disposed on a supporting surface 24 for monitoring alternating current in a plurality of high current conductors 25. Each of the conductors 25 illustrated extends between a remote current source and a current load, such as a motor. The wires are routed mechanically through generally circular toroidal current sensors 27–29 that respond magnetically and are monitored by the electronic circuitry to be hereinafter described. Thus system 20 is electrically isolated from the load being monitored and controlled.

Optional serial communication with system 20 can be provided by a conventional modem 32 coupled to the system with serial line 30. The modem connects to a standard telephone line via cable 34, enabling remote control and access of system 20. Incoming power to the apparatus is provided through conventional electrical lines 35, and remote relays, the fields of which are controlled by system 20 via conventional lines 38. A suitable electrical fitting 19 fitted to cabinet 22 routes the conductors 34, 38 to the internal housing and circuitry.

With primary reference directed now to FIGS. 1–3, cabinet 22 includes a pair of spaced apart ends 40, 41, integral with rear and front panels 42 and 44 respectively. Preferably the cabinet 22 includes a translucent top 46 permitting visual inspection of the circuit board 48 (FIG. 2) disposed within the cabinet 22. Board 48 is secured within the bottom cabinet portion 23 above the lower floor 21B. Conventional removable screws 48 (FIG. 3) secure cabinet top 46. Reinforced feet 50 extend from the bottom of the cabinet 22 for mounting to a suitable supporting surface or structure 24 through mounting orifices 51 (FIGS. 2, 3).

The current sensors 27–29 are mechanically braced at their interior end 25B with suitable tabs soldered to circuit board 48. Their outermost edges 25C are mechanically braced and wedged between the cabinet bottom 23 and the top 46. Alternatively, the current sensing coils may be separate from the cabinet, and interconnected with the circuit board by suitable cables.

As best viewed in FIGS. 2 and 10–12, a liquid crystal display (LCD), generally designated by the reference numeral 52, displays written indicia for programming and use of system 20. The LCD is preferably a Seiko model L2014, that includes its own proprietary highly integrated driver package. LCD 52 displays all working characteristics, setups and emergency conditions.

As best viewed in FIG. 3, initial programming of the device is initiated during power up by disposing one's finger 56 upon the translucent top 46 adjacent one of a plurality of "light buttons" 58A–58D, comprising optical OPIC transmitter-receiver pairs. The activating software will be described in detail hereinafter. These "light buttons" 58A–58D are activated when an object, such as a finger 56, is placed on or near the translucent surface 46 of the cabinet 22 near an infrared transmitting LED 200–203. They are substantially immune to ambient light as long as bright light does not strike the receivers directly, which can cause infrared saturation. These buttons allow a better seal of the electronics while still enabling direct access to the microcontroller. They are also advantageous since they replace mechanical switches that are unreliable. When one's finger is placed on the spot indicated in FIG. 3 to activate light button 58C, light transmitted by path 57 from the LED 202 is reflected back to OPIC 208 to produce a binary response evaluated by the circuits and software to be described hereinafter.

Figure 4:
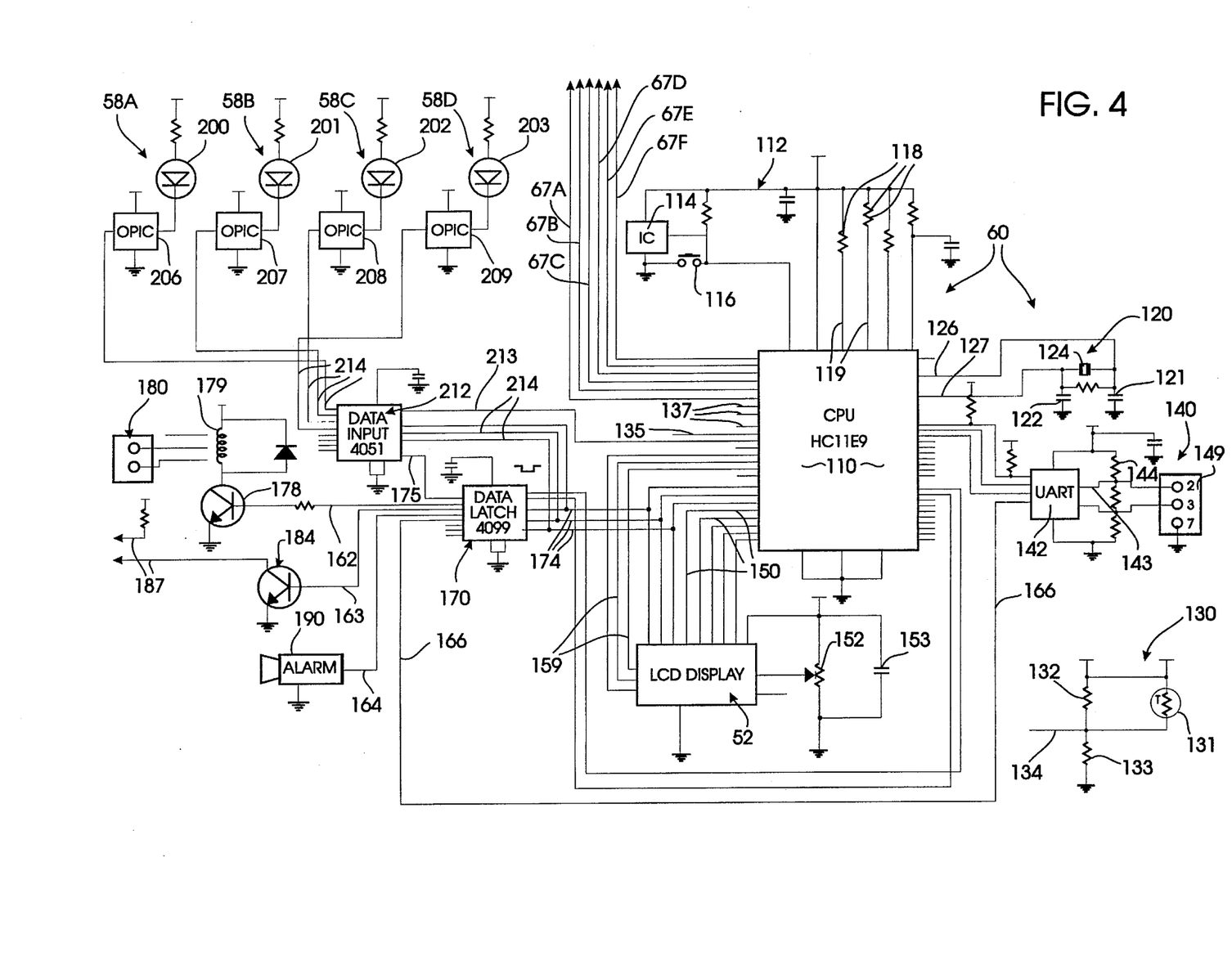
FIG. 4 is an electronic schematic diagram of the CPU circuitry.
Figure 5:
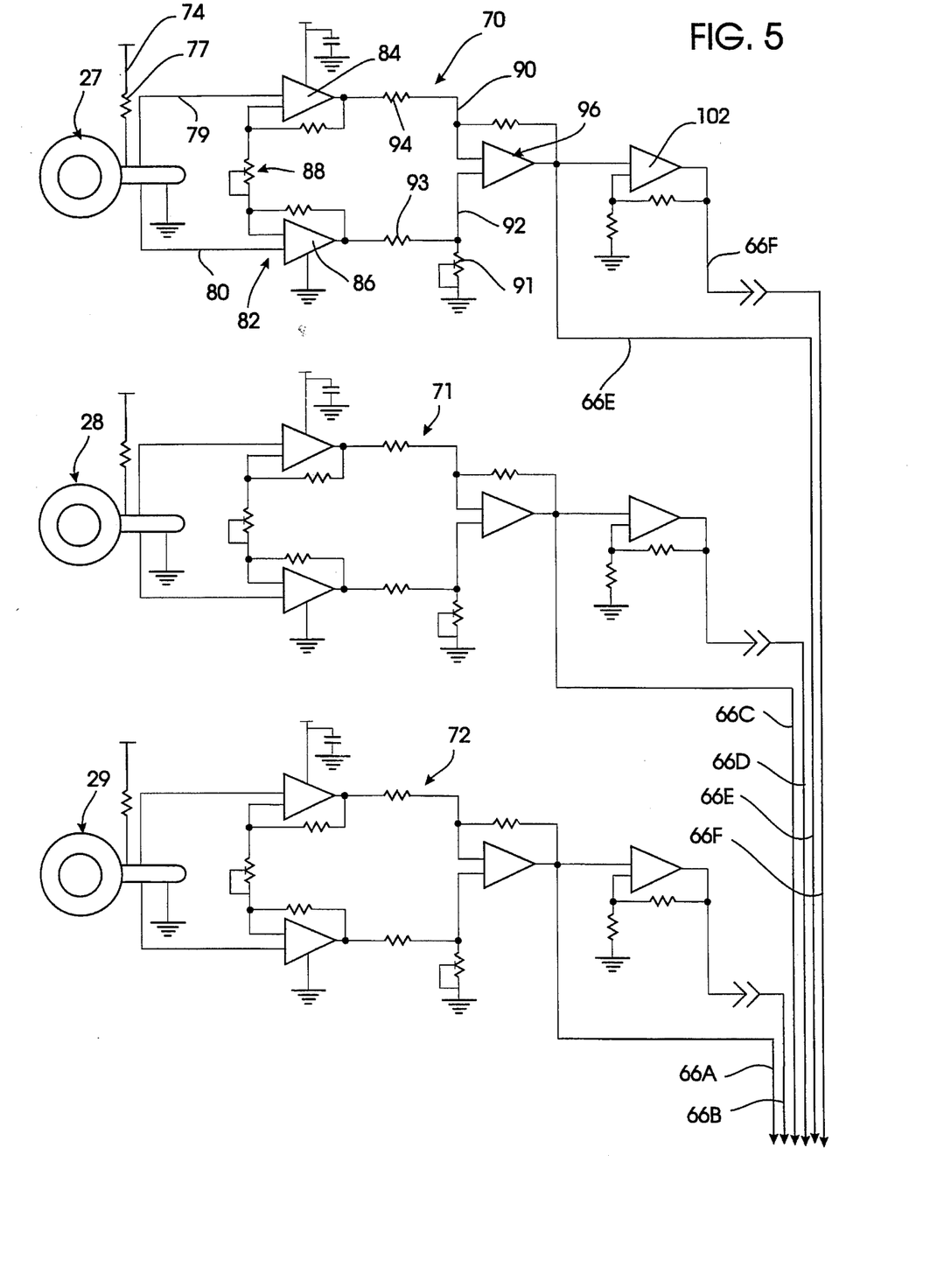
FIG. 5 is an electrical schematic of the preferred current sensing coil array.
Figure 6:
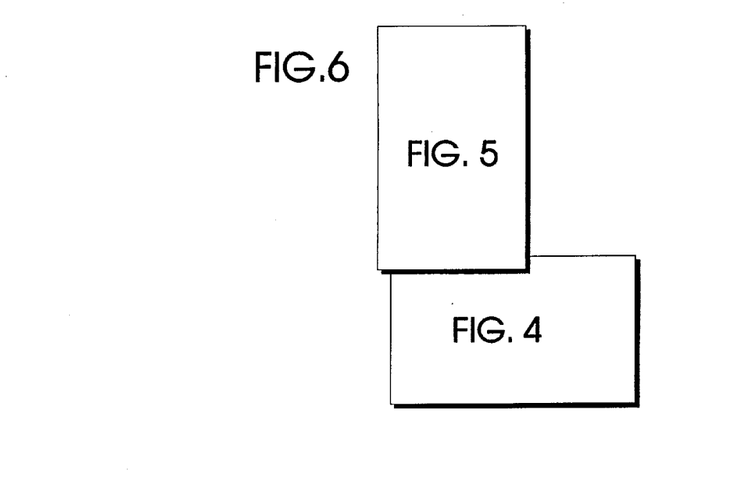
FIG. 6 is a diagrammatic view illustrating how FIGS. 4 and 5 should be oriented for viewing.

With primary reference directed now to FIGS. 4 and 5, the main electronic circuit 60 is interconnected with the three toroidal Hall effect current sensors 27–29 (FIG. 5). FIGS. 4 and 5 should be viewed by orienting them as indicated in FIG. 6. Three identical current sensing circuits are interconnected via lines 66A, 66B, 66C, 66D, 66E and 66F (FIG. 5) to lines 67A, 67B, 67C, 67D, 67E and 67F (FIG. 4) respectively. Lines 67A–67F lead to the A/D ports of the CPU 110 (FIG. 4). Since each of the sensors 27, 28, 29 are connected to identical circuitry, only one of the three identical circuits of FIG. 5 will be described in detail. However, it is to be emphasized at this point that sensing coil arrays may be employed either singly, or in double, triple, or greater configurations. Hence, the circuit 60 may easily monitor either single phase or three-phase installations. More particularly it should be understood that system 20 may multiplex the monitoring of three separate single phase systems.

A typical circuit for handling the Hall effect current sensors 27–29 has been designated by the reference numeral 70 (FIG. 5.) Subcircuit 70 is associated with sensor 27, and identical subcircuits 71 and 72 are associated with companion sensors 28 and 29 respectively. The current monitor is powered from line 74 through resistor 77. Signal lines 79 and 80 are delivered to an instrumentation amplifier generally designated by the reference numeral 82, comprising a pair of OP-amps 84 and 86 interconnected by an offset adjusting potentiometer 88. Outputs through resistors 93, 94 are applied to differential amplifier 96 via lines 92, 90. The output of differential amplifier 96 appears on line 66E, and it is applied to op-amp 102. A zeroing potentiometer 91 is connected to line 92. Line 66E represents an analog input into the CPU A/D input to be hereinafter described.

The output from line 66E is also delivered to operational amplifier 102 that multiplies the analog signal on line 66E by ten and outputs the proportionally larger analog signal to line 66F. Line 66F preferably presents ten times the voltage swing of line 66E, and thus represents ten times the monitored current swing. Line 66E provides the analog information for measuring currents from 0–10 amps, whereas line 66F provides information to measure 0–100 amps. Concurrently, in the other two phases, lines 66C and 66D present similar amplitude proportions, as do lines 66A and 66B.

Turning now to FIG. 4, lines 67A–67F are delivered to the CPU 110, nominally a Motorola HC11E9. The CPU 110 is the microprocessor for the control circuit, and it is interconnected with a variety of other circuits to be described. Command control and user programming of the CPU 110 is effectuated by the transmitter-receiver pairs of the switches 58A–58D.

Reset circuit 112 (FIG. 4) comprises an integrated circuit (IC) 114 activated by a switch 116 for resetting. Pull up resistors 118 are interconnected with CPU 110 via lines 119. The circuit resets automatically to reinitialize the CPU. Clock speed is determined by a crystal oscillator circuit 120. It includes a pair of capacitors 121 and 122 with an oscillator crystal 124 connected across lines 126, 127. Preferably a temperature sensing circuit 130 is included to facilitate thermal monitoring. Circuit 130 comprises a thermistor 131 biased by resistors 132 and 133. An analog temperature sensing output appearing on line 134 is inputted to an available CPU A/D port via line 135. Other CPU A/D lines such as line 137 can be used to assimilate other sensors, where, for example, more points are to be monitored.

Serial data is available from the communication circuit 140. This circuit includes a communications chip 142 transmitting on lines 143 through resistors 144 to RS-232 communications port 149. The serial communication capability is interrupt-driven and will be discussed further hereinafter.

Eight bit data is transmitted from the CPU 110 along lines 150 to the input of LCD 52. Display 52 is biased by LCD offset potentiometer 152 which is bypassed by capacitor 153. The display 52 is controlled by read-write-enable command lines 159 emanating from CPU 110. Lines 162–164 and 166 outputted from data latch 170 are controlled by three bit logic signals appearing on lines 174. Driver line 162 controls driver transistor 178 which energizes relay field 179 to activate a control relay 180. Relay 180 is connected to remote relays associated with the load to be controlled. The relays disconnect current to the load when an error or alarm condition is determined. Line 163 controls a driver transistor 184 which activates a back light associated with display 52 via lines 187. Line 164 activates an alarm 190 to provide a warning when a preselected condition occurs. The serial output port system 140 is controlled by line 166 applied to communication chip 142.

With joint reference to FIGS. 2–4, each transmitter-receiver pair 58A–58D comprises an LED 200–203 and an OPIC 206–209. The LEDs 200–203 beam light physically upwardly from the circuit board 48. The OPICs 206–209 respectively associated with each LED 200–203 sense reflected light. OPICS 206–209 communicate with data input chip 212 via lines 214. Chip 212 is activated by data latch 170 when line 175 goes high. Three bit logic statements are present on lines 214. As the operator places his finger as shown in FIG. 3, light reflected from a particular LED may be reflected back to the companion OPIC to generate a programming signal which reaches data latches 170 and 212, LCD 52 and/or CPU 110.

Figure 7:
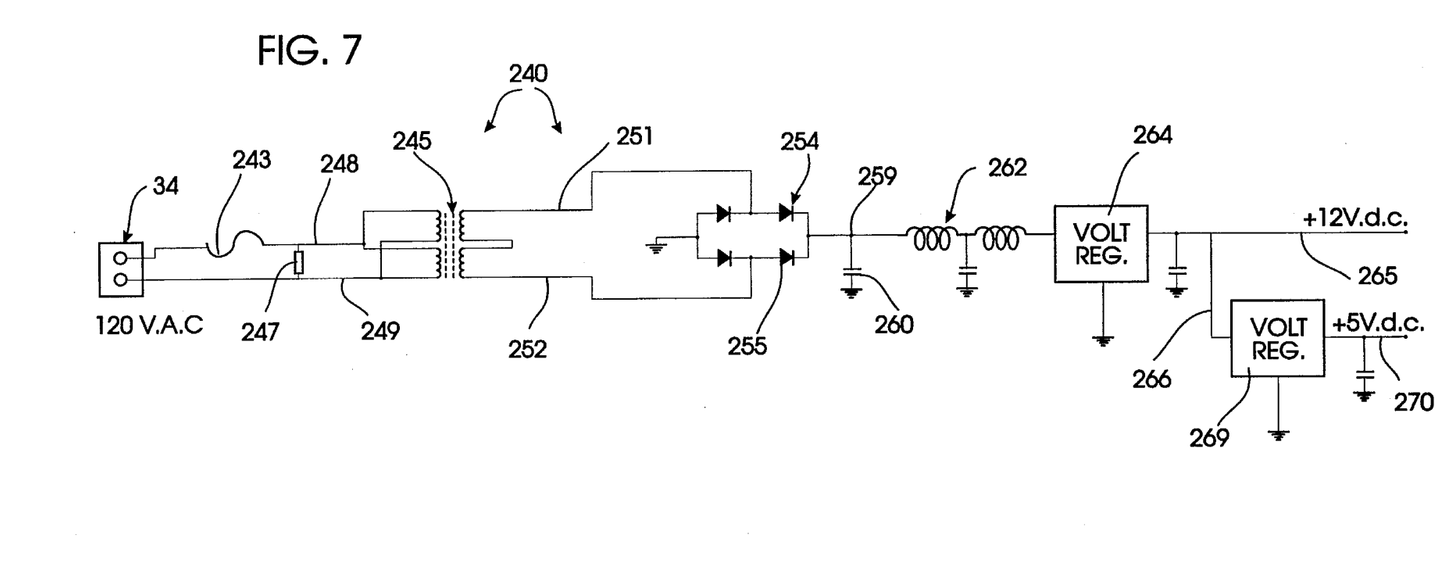
FIG. 7 is an electrical schematic diagram of the preferred regulated power supply for the system.

With reference now to FIG. 7, the power supply has been designated by the reference numeral 240. Nominally one hundred-twenty volt AC current is supplied via terminal 34, through fuse 243, to power transformer 245. A transient suppressor 247 is disposed across power lines 248 and 249 which lead to transformer 245. Secondary voltage across lines 251, 252 is applied to a bridge rectifier circuit 254 comprised of individual diodes 255. Positive voltage is applied to node 259 across filter capacitor 260, and transmitted through filter network 262 to a voltage regulator 264. Twelve volt current is available on lines 265 and 266. Companion voltage regulator 269 outputs five volts DC on line 270.

Figure 8:
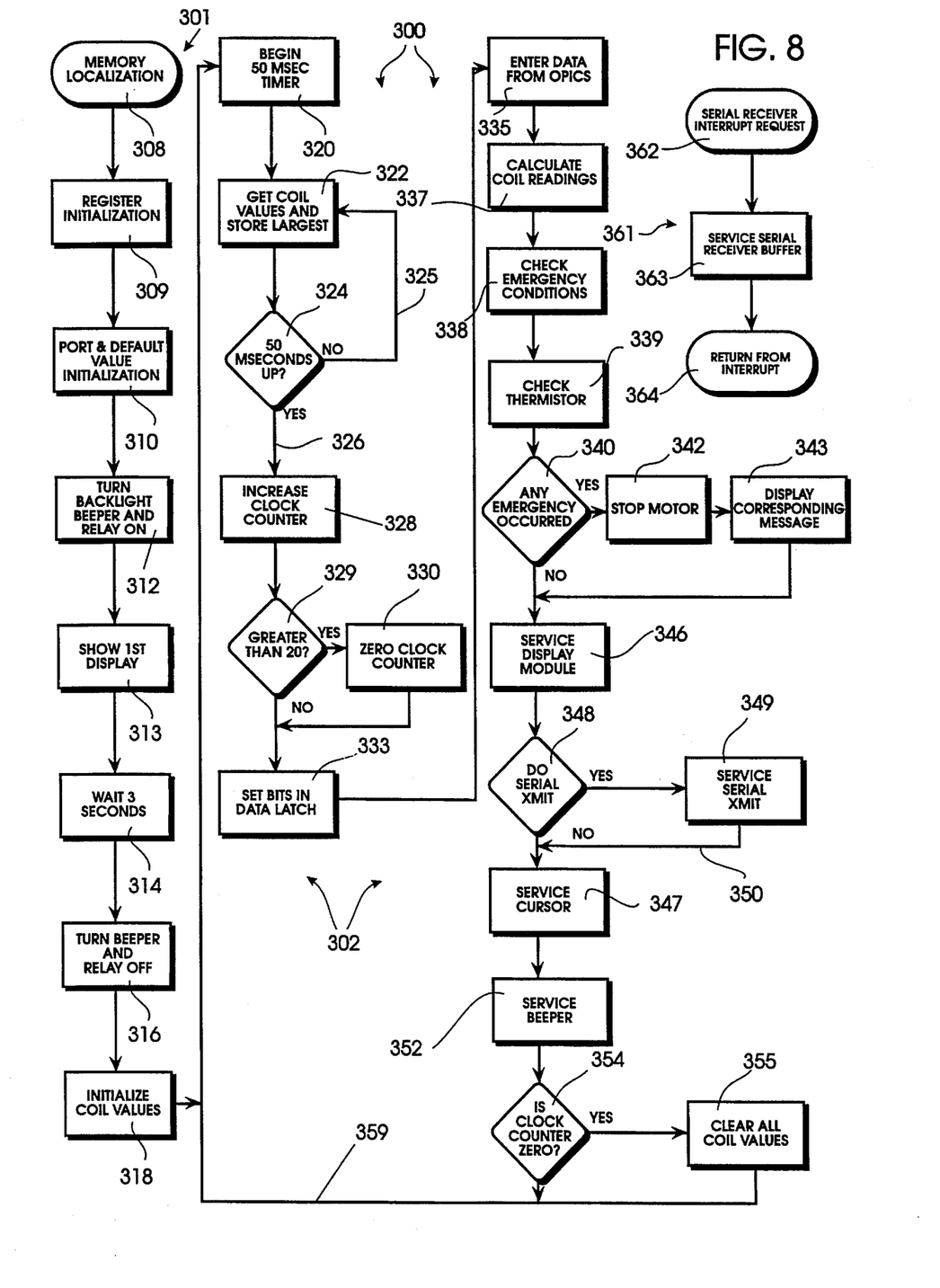
FIG. 8 is a software logic diagram of the preferred control logic.

Turning now to FIG. 8, the software program executed by the CPU 110 has been generally designated by the reference numeral 300. The software executes an initialization sequence 301 when first activated. Sequence 301 once initialized activates a repetitive loop 302. Initialization sequence 301 begins with the memory localization step 308 followed by register initialization step 309 and port and value initialization step 310. At this point step 312 causes temporary initial energization of the LCD back light transistor 184 (FIG. 4), the alarm 190, and the relay field coil 179. Relay 180 is thus tested in this start-up sequence. The LCD 52 is triggered with the first display at step 313. This is followed by a pause of 3 seconds at step 314, and the deenergization of the alarm 190 and relay field 179 at step 316. Coil-current values sensed at start up are initialized at step 318. The latter step stores the digital values read from the sensor coils when there is zero motor (or load) current. Loop 302 follows.

Operation loop 302 commences with step 320 which initiates a preselected timing interval, nominally fifty milliseconds. In step 320 CPU 110 analyzes the analog values appearing variously on lines 67A–67F (FIG. 4) over the timing interval, and stores the largest value in step 322. This progresses as indicated in step 324 until the time interval established in step 320 has expired. When the interval has expired, return step 325 is replaced by path 326 to step 328 that increases the clock counter. If less than twenty such cycles have been counted in step 329, step 33 follows. The clock counter is zeroed at step 330, usually after one minute of operation. The fifty millisecond sampling period occurs twenty times, providing a one-second timing base interval for the other clocks.

In step 333 the bits are set in the data latch 170 (FIG. 4); CPU lines 174 will be energized in step 333 and read data is thus available to latch 170 and chip 212. In step 335 parameters may be inputted by "pressing" the OPIC light switches previously discussed. At this time the data input chip 212 (FIG. 4) will have been enabled in step 335 on line 213. Coil readings are calculated in step 337 and these are compared to preselected stored emergency conditions in step 338. As will be explained hereinafter, the emergency conditions can be preprogrammed when the diagnostic mode is selected.

In step 339 the thermistor circuit (FIG. 4) is checked. The analog voltage derived between resistors 132 and 133 is applied to a CPU A/D input 135, and converted to a digital representation. If it matches a user selected limit (i.e. user-inputted in step 335) an alarm condition can be signaled and an LCD warning is displayed.

If an emergency or alarm condition has been determined in step 340, step 342 is executed by the CPU to deenergize field 179 (FIG. 4) and thus stop the load or motor. Line 162 (FIG. 4) will be driven high by data latch 170, which will have been activated by the three bit logic from the CPU on lines 174 (FIG. 4). Subsequently, a message is displayed on the LCD 52 in step 343, in response to LCD Display commands outputted on lines 159 (FIG. 4). If no emergency has occurred at step 340, service steps 346 and 347 are executed. In step 348 a serial transmit detection step occurs to determine if serial information is present at port 149 (FIG. 4). If it is detected, the port is serviced in step 349. Service cursor step 347 and service beeper step 352 follow. The clock counter is referenced at step 354 if the counter is zero all coil values are cleared in step 355. If the clock counter is not zero, a return to step 320 is initiated as indicated by line 359.

At any time an interrupt request, indicated by subroutine 361, may reference received data. Step 362 indicates the interrupt-driven receive interrupt step. The receiver buffer is serviced in step 363 followed by the return in step 364.

Figure 9:
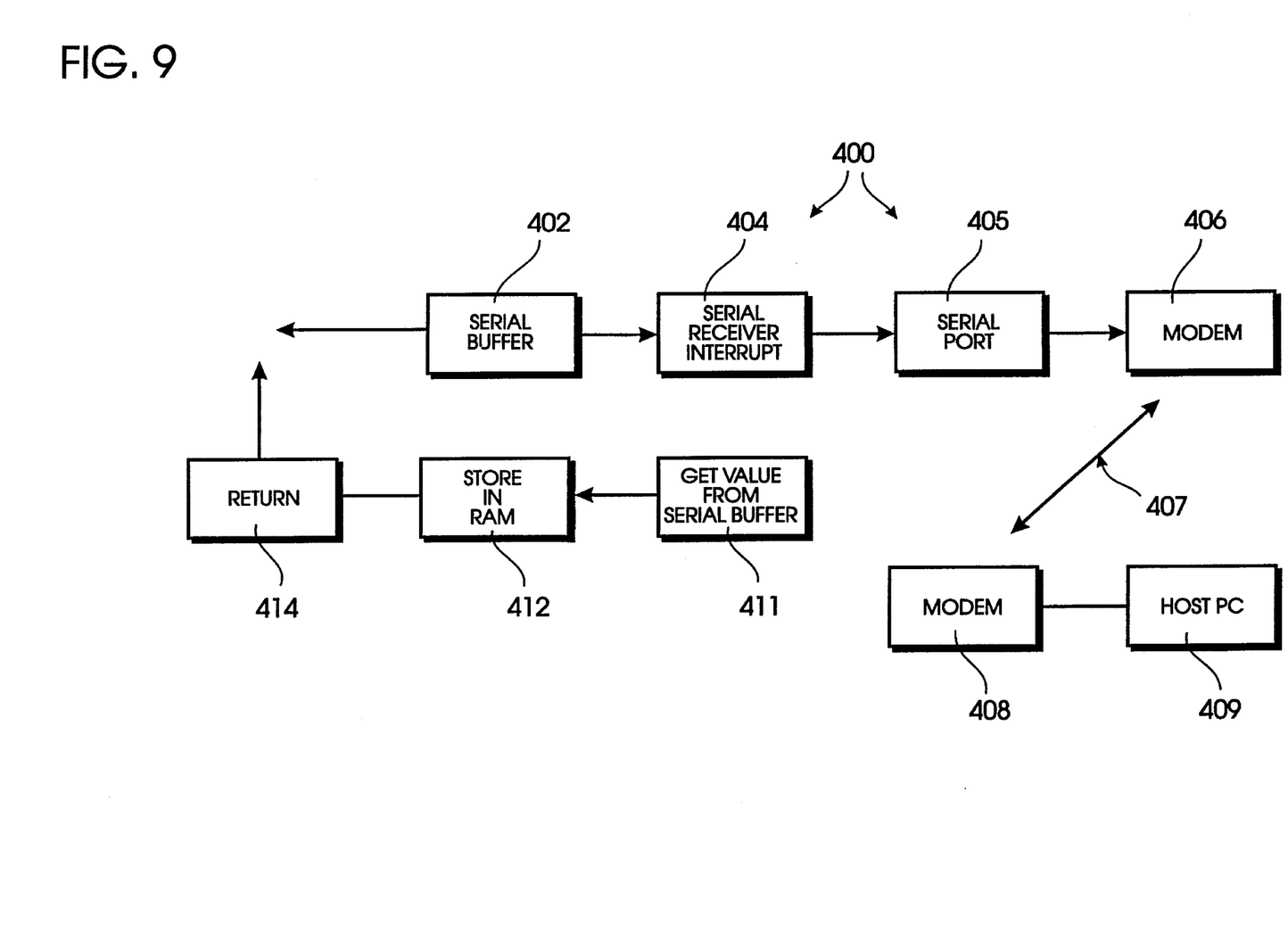
FIG. 9 is a block diagram of the preferred communications software logic.
Figure 10:
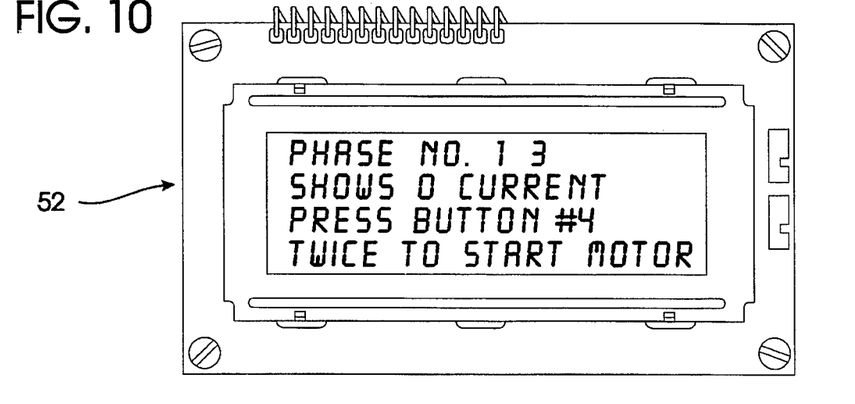
FIGS. 10–12 are fragmentary pictorial views of the LCD system showing typical screen displays during use.
Figure 11:
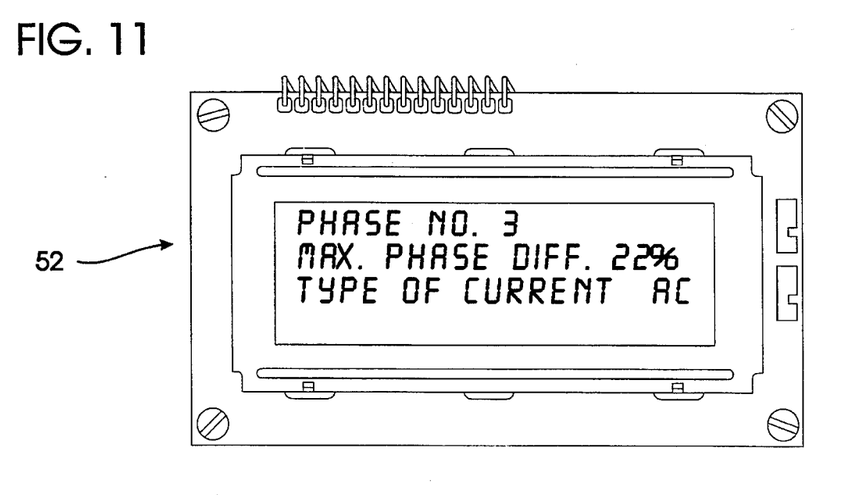
Figure 12:
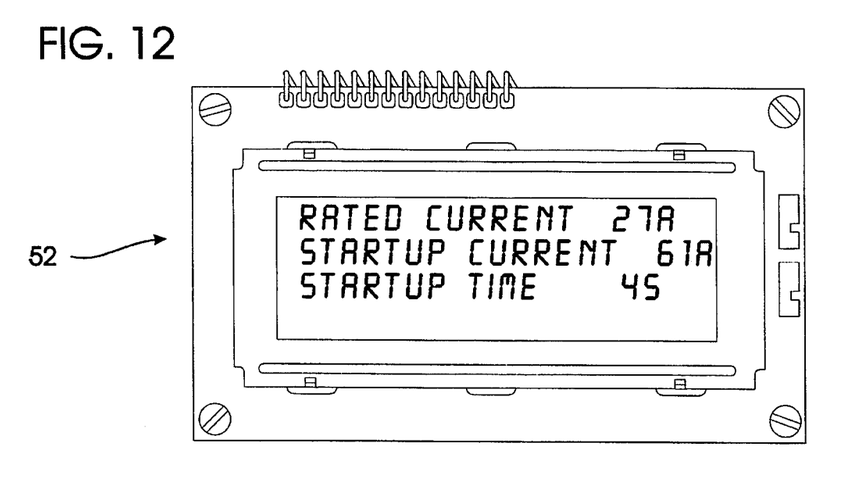

Turning now to FIG. 9, the serial port detection circuitry software steps are generally designated by the reference numeral 400. When service port step 349 is executed in FIG. 8, a routine 400 of FIG. 9 occurs. The serial buffer is energized at step 402 followed by the serial interrupt referencing in step 404. The software energizes the serial port 405 in the transmit mode so that an external modem 406 can communicate via telephone line generally designated by the reference numeral 407 with a remote modem 408 and host computer 409. Also at step 404 the value from the serial buffer is recognized in step 411, stored in random access memory at step 412. Return to step 402 occurs in step 414.

OPERATION

The first button 58A changes the menu being displayed. These menus consist of the introductory menu, the working menu and two setup menus. The LCD will display the message "Press Button #1 to Start Motor" when the device is first powered up. Immediately the LCD will display the user-programmed parameters to be sensed in the setup menus. The first setup menu displays "Rated Current," "Start-up Current," and "Start-up Time," s illustrated by FIG. 12. The rated current is the actual working current for the motor with the load attached. The maximum value is one hundred amps for both AC and DC. The startup time is the time increment within a specified time within which the motor (or other load) is first turned on. The startup current will usually be from two to seven times the rated current value. This maximum value is also one hundred amps. Startup time is the amount of time that the startup current remains. This parameter is user selectable, and is usually no longer than ten seconds. Maximum value is twenty seconds. During startup time, the controller looks at only the Start-up current to monitor that it is not exceeded. After the startup time the controller will monitor the rated current to insure it is not exceeded.

The second setup menu (FIG. 11) displays the "Phase number," the "Maximum Phase Difference," and "Type of current" parameters, each of which may be selected by the user. The monitored phase number allows user to select between one and three monitored phases. The maximum phase difference enables the user to monitor a selected maximum percent difference between phases. When the percentage difference exceeds the set value the controller enters an emergency mode. The type of current is toggled between AC and DC readings. The DC shows the direct current value and when in AC, the display shows the true RMS value.

Pressing the second button 58B once services the "rated current" cursor, so the third and/or fourth buttons can now increment or decrement the monitored limit. The second button can be pressed as desired to thereafter select the monitored "startup current" or "startup time" for incrementing or decrementing as desired with buttons 58C and 58D. Thus the second button 58B chooses the variable to change in the particular menu. When a value is chosen it will blink. Pressing it again will advance to the next variable. The third and fourth buttons 58C, 58D increase and/or decrease the value chosen. This can be done only when the value is blinking. The value increases or decreases in increments of one. The fourth button 58D is also used to start the motor.

When first turned on the display 52 will show the company name and other relevant characteristics. This will be displayed for about 3 seconds. This time is used to initialize the controller to its startup values and conditions, and to allow a quick diagnostics routine of the hardware 318. Following this, the LCD may display the message seen in FIG. 10, flashing "PRESS BUTTON #4 TWICE TO START MOTOR." This refers to the starting relay 180, that controls the remote motor relay which in turn controls the motor. To start the controlled load (i.e., the remote motor) the fourth button 58D is touched twice. The motor relay should close immediately and the motor should start. If the motor begins power up without exceeding any of the set parameters, the controller should continue powering the motor until an emergency condition appears.

Whenever any of the set parameters are exceeded, the controller will, within 0.1 seconds, turn the motor relay off and display the causes of the emergency condition on the LCD 52. "RATED CURRENT HAS BEEN EXCEEDED" is displayed if rated current exceeds set value. "STARTUP CURRENT HAS BEEN EXCEEDED" is displayed if startup current exceeds set value. "PHASE NO. XXX SHOWS 0 CURRENT" is displayed if any phase goes to Zero amps, and the phase number that has fallen to Zero is displayed. This only becomes activated when the motor has gone out of startup time. "PHASE NO.XXX HAS GONE PAST SET LEVEL" is displayed when any of the phases has drifted past the maximum phase difference value. The phase that drifted is displayed.

Preferably the controller samples the sensors eighty times every one-twentieth of a second. This means that the worst case response situation will be one-tenth of a second.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention we claim:

1. An electronic system for monitoring and controlling current in an electrical load, said system comprising:

means for sensing electrical current in said load, said current sensing means comprising toroidal coil means circumscribing a conductor to be monitored for sensing conductor current therein;

subcircuit means for generating a first analog signal corresponding to said conductor current from said sensing means, and a second analog signal that is proportionally larger that said first analog signal;

CPU means for selecting either said first or second analog signal from said subcircuit means and digitally evaluating current phases and amplitudes, said CPU operable to process digitized information derived from said first or second analog signals to determine the existence of emergency conditions;

logic lines outputted from said CPU;

relay means responsive to said logic lines for interrupting power in a conductor sensed by said system;

alarm means responsive to said logic lines for providing a warning when a preselected condition occurs;

display means for visually displaying digital data and menus in response to said CPU;

touch responsive data input means interconnected with said logic lines for programming said system; and, computer program means for instructing said CPU means.

2. The system as defined in claim 1 wherein said touch responsive data input means manually controls said CPU means without moving parts, said data input means comprising means for projecting light towards a spot adapted to be touched by a user, means for receiving light when a users' touch reflects same, and means for alerting said CPU means when light reflection has occurred to program the system.

3. The system as defined in claim 2 wherein said touch responsive data input means comprises:

a first data input button for selecting a menu to be displayed in accordance with said computer program means;

a second data input button for servicing a cursor in the menu selected by said first data input button enabling it to select a displayed parameter;

a third data input button for incrementing the desired parameter selected by said cursor; and, a fourth data input button for decrementing the desired parameter selected by said cursor.

4. The system as defined in claim 3 wherein said system comprises:

means for triggering said display to provide an introductory menu, a working menu and two setup menu in response to said first button;

wherein said first setup menu displays Rated Current, Startup Current, and Startup Time; and, wherein said second setup menu displays the Phase Number, the Maximum Phase Difference, and Type of Current parameters.

5. The system as defined in claim 1 wherein said system comprises:

means for counting a preselected timing interval during initialization;

means for establishing a preselected sampling interval after initialization;

means for sampling current values from said subcircuit means and storing the largest value obtained within said sampling interval;

means for determining the existence of emergency conditions by comparing said largest value against a preselected memory data set of emergency conditions inputted by said touch responsive data input means; and, means for activating said relay means and transmitting a message to said display means if an emergency condition has been determined.

6. The system as defined in claim 5 wherein said subcircuit means comprises:

an instrumentation amplifier comprising a pair of OP-amps interconnected by an offset adjusting potentiometer;

a differential amplifier driven by said instrumentation amplifier for outputting said first analog output;

a zeroing potentiometer connected to said differential amplifier; and, an operational amplifier for multiplying said first analog output and providing said second, proportionally larger analog output.

7. A solid state electronic system for monitoring and controlling current in at least one leg of a multi-phase, AC or DC electrical load, said system comprising:

means for sensing electrical current in at least one phase of said load, said current sensing means comprising toroidal coil means circumscribing a conductor in each phase to be monitored for sensing conductor current therein;

subcircuit means for generating an analog signal corresponding to said conductor current from said sensing means, CPU means for digitally evaluating current phases and amplitudes, said CPU operable to process digitized information derived from said analog signal to determine the existence of emergency conditions;

logic lines outputted from said CPU;

relay means responsive to said logic lines for interrupting power in a conductor sensed by said system;

alarm means responsive to said logic lines for providing a warning when a preselected condition occurs;

display means for visually displaying digital data and menus in response to said CPU;

touch responsive data input means interconnected with said logic lines for programming said system, said touch responsive data input means manually controlling said CPU means without moving parts, said data input means comprising means for projecting light towards a spot adapted to be touched by a user, means for receiving light when a users' touch reflects same, and means for alerting said CPU means when light reflection has occurred to program the system; and, computer program means for instructing said CPU means.

8. The system as defined in claim 7 wherein said touch responsive data input means comprises:

a first data input button for selecting a menu to be displayed in accordance with said computer program means;

a second data input button for servicing a cursor in the menu selected by said first data input button enabling it to select a displayed parameter;

a third data input button for incrementing the desired parameter selected by said cursor; and, a fourth data input button for decrementing the desired parameter selected by said cursor.

9. The system as defined in claim 8 wherein said system comprises:

means for triggering said display to provide an introductory menu, a working menu and two setup menu in response to said first button;

wherein said first setup menu displays Rated Current, Start-up Current, and Startup Time; and, wherein said second setup menu displays the Phase Number, the Maximum Phase Difference, and Type of Current parameters.

10. The system as defined in claim 7 wherein said system comprises:

means for counting a preselected timing interval during initialization;

means for establishing a preselected sampling interval after initialization;

means for sampling current values from said subcircuit means and storing the largest value obtained within said sampling interval;

means for determining the existence of emergency conditions by comparing said largest value against a preselected memory data set of emergency conditions inputted by said touch responsive data input means; and, means for activating said relay means and transmitting a message to said display means if an emergency condition has been determined.

11. The system as defined in claim 10 wherein said subcircuit means comprises:

an instrumentation amplifier comprising a pair of OP-amps interconnected by an offset adjusting potentiometer;

a differential amplifier driven by said instrumentation amplifier for outputting said first analog output;

a zeroing potentiometer connected to said differential amplifier; and, an operational amplifier for multiplying said first analog output and providing said second, proportionally larger analog output.

12. A solid state electronic system for monitoring and controlling current in at least one leg of a multi-phase, AC or DC electrical load, said system comprising:

means for sensing electrical current in at least one phase of said load, said current sensing means comprising toroidal coil means circumscribing a conductor in each phase to be monitored for sensing conductor current therein;

subcircuit means for generating a first analog signal corresponding to said conductor current from said sensing means, and a second analog signal that is proportionally larger that said first analog signal;

CPU means for selecting either said first or second analog signal from said subcircuit means and digitally evaluating current phases and amplitudes, said CPU operable to process digitized information derived from said first or second analog signals to determine the existence of emergency conditions;

logic lines outputted from said CPU;

relay means responsive to said logic lines for interrupting power in a conductor sensed by said system;

alarm means responsive to said logic lines for providing a warning when a preselected condition occurs;

display means for visually displaying digital data and menus in response to said CPU;

touch responsive data input means interconnected with said logic lines for programming said system, said touch responsive data input means manually controlling said CPU means without moving parts, said data input means comprising means for projecting light towards a spot adapted to be touched by a user, means for receiving light when a users' touch reflects same, and means for alerting said CPU means when light reflection has occurred to program the system; and, computer program means for instructing said CPU means.

13. The system as defined in claim 12 wherein said touch responsive data input means comprises:

a first data input button for selecting a menu to be displayed in accordance with said computer program means;

a second data input button for servicing a cursor in the menu selected by said first data input button enabling it to select a displayed parameter;

a third data input button for incrementing the desired parameter selected by said cursor; and, a fourth data input button for decrementing the desired parameter selected by said cursor.

14. The system as defined in claim 13 wherein said system comprises:

means for triggering said display to provide an introductory menu, a working menu and two setup menu in response to said first button;

wherein said first setup menu displays Rated Current, Startup Current, and Startup Time; and, wherein said second setup menu displays the Phase Number, the Maximum Phase Difference, and Type of Current parameters.

15. The system as defined in claim 12 wherein said system comprises:

means for counting a preselected timing interval during initialization;

means for establishing a preselected sampling interval after initialization;

means for sampling current values from said subcircuit means and storing the largest value obtained within said sampling interval;

means for determining the existence of emergency conditions by comparing said largest value against a preselected memory data set of emergency conditions inputted by said touch responsive data input means; and, means for activating said relay means and transmitting a message to said display means if an emergency condition has been determined.

16. The system as defined in claim 15 wherein said subcircuit means comprises:

an instrumentation amplifier comprising a pair of OP-amps interconnected by an offset adjusting potentiometer;

a differential amplifier driven by said instrumentation amplifier for outputting said first analog output;

a zeroing potentiometer connected to said differential amplifier; and, an operational amplifier for multiplying said first analog output and providing said second, proportionally larger analog output.

17. A portable, solid state electronic system for monitoring and controlling current in at least one leg of a multiphase, AC or DC electrical load, said system comprising:

a rigid, generally cubicle housing adapted to be disposed upon a supporting surface or attached to a supporting structure, said housing comprising a translucent cover;

means for sensing electrical current in at least one phase of said load, said current sensing means comprising toroidal coil means circumscribing a conductor in each phase to be monitored for sensing conductor current therein;

subcircuit means for generating a first analog signal corresponding to said conductor current from said sensing means, and a second analog signal that is proportionally larger that said first analog signal;

CPU means for selecting either said first or second analog signal from said subcircuit means and digitally evaluating current phases and amplitudes, said CPU operable to process digitized information derived from said first or second analog signals to determine the existence of emergency conditions;

logic lines outputted from said CPU;

relay means responsive to said logic lines for interrupting power in a conductor sensed by said system;

alarm means responsive to said logic lines for providing a warning when a preselected condition occurs;

display means for visually displaying digital data and menus in response to said CPU;

touch responsive data input means for programming said system, said touch responsive data input means manually controlling said CPU means without moving parts, said data input means comprising means for projecting light towards a spot on said translucent cover adapted to be touched by a user, means for receiving light when a users' touch reflects same, and means for alerting said CPU means when light reflection has occurred to program the system; and, computer program means for instructing said CPU means.

18. The system as defined in claim 17 wherein said touch responsive data input means comprises:

a first data input button for selecting a menu to be displayed in accordance with said computer program means;

a second data input button for servicing a cursor in the menu selected by said first data input button enabling it to select a displayed parameter;

a third data input button for incrementing the desired parameter selected by said cursor; and, a fourth data input button for decrementing the desired parameter selected by said cursor.

19. The system as defined in claim 18 wherein said system comprises:

means for counting a preselected timing interval during initialization;

means for establishing a preselected sampling interval after initialization;

means for sampling current values from said subcircuit means and storing the largest value obtained within said sampling interval;

means for determining the existence of emergency conditions by comparing said largest value against a preselected memory data set of emergency conditions inputted by said touch responsive data input means;

means for activating said relay means and transmitting a message to said display means if an emergency condition has been determined;

means for triggering said display to provide an introductory menu, a working menu and two setup menu in response to said first button;

wherein said first setup menu displays Rated Current, Startup Current, and Startup Time; and, wherein said second setup menu displays the Phase Number, the Maximum Phase Difference, and Type of Current parameters.

20. The system as defined in claim 17 wherein said subcircuit means comprises:

an instrumentation amplifier comprising a pair of OP-amps interconnected by an offset adjusting potentiometer;

a differential amplifier driven by said instrumentation amplifier for outputting said first analog output;

a zeroing potentiometer connected to said differential amplifier; and, an operational amplifier for multiplying said first analog output and providing said second, proportionally larger analog output.

* * * * *